J. W. MARTIN.
PNEUMATIC WHEEL.
APPLICATION FILED JAN. 21, 1915.

1,216,714.

Patented Feb. 20, 1917.

Witnesses
W. B. Cooke
Walter Jamariss

Inventor
John W. Martin,
By J. W. Cooke,
Attorney.

UNITED STATES PATENT OFFICE.

JOHN W. MARTIN, OF PITTSBURGH, PENNSYLVANIA.

PNEUMATIC WHEEL.

1,216,714.  Specification of Letters Patent.  Patented Feb. 20, 1917.

Application filed January 21, 1915.  Serial No. 3,477.

*To all whom it may concern:*

Be it known that I, JOHN W. MARTIN, a citizen of the United States, and a resident of Pittsburgh, in the county of Allegheny and State of Pennsylvania, have invented a new and useful Improvement in Pneumatic Wheels; and I do hereby declare the following to be a full, clear, and exact description thereof.

My present invention relates to new and useful improvements in vehicle wheels, and has particular reference to an improved form of pneumatic wheel hub or axle cushion.

The principal object of the invention is to construct the pneumatic wheel center or hub with such regard to number and arrangement of parts that the wheel may be cheaply manufactured and will be thoroughly practicable in service, being durable and efficient.

The above, and other incidental objects of a similar nature which will be hereinafter more specifically described, are accomplished by such means as are illustrated in the accompanying drawings, described in the following specification, and then more particularly pointed out in the claim, which is appended hereto and forms a part of this application.

With reference to the drawings, wherein there has been illustrated the preferred embodiment of the invention, as it is reduced to practice, and throughout the several views of which similar reference numerals designate corresponding parts;

Figure 1:
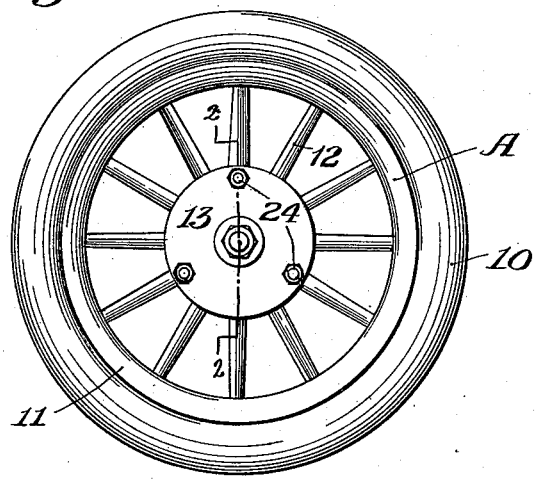
Figure 1 is a side elevation of a wheel embodying my invention.
Figure 2:
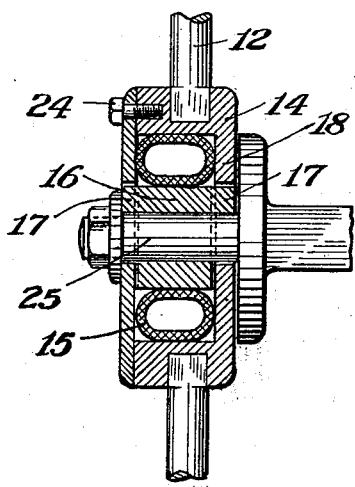
Fig. 2 is a section on the line 2—2 of Fig. 1.

In the accompanying drawings the wheel designated as an entirety by the letter "A" includes as its essential elements of construction a tire 10, a rim 11, the spokes 12 and a hub or center 13.

The tire and rim are of standard construction and are supported in the usual manner by means of the spokes, the inner ends of which are set in the body portion 14 of the hub.

Figure 3:
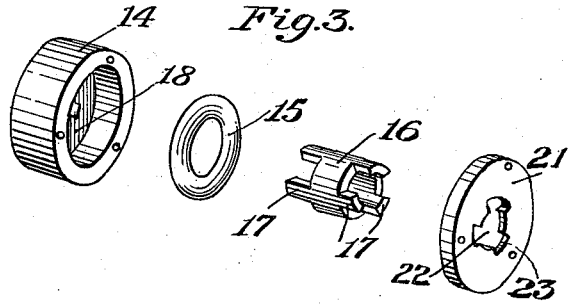
Fig. 3 is a perspective view of the pneumatic hub with the elements thereof in disassembled relation.
Figure 4:
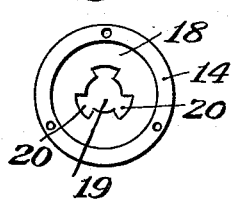
Fig. 4 is an end view of the hub plate.
Figure 5:
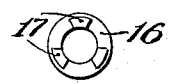
Fig. 5 is an end view of the hub casing.

The body portion 14 of the hub is substantially cylindrical in shape, being in the nature of a hollow shell. Within the member 14 is disposed the pneumatic cushion 15, which is annular in shape, corresponding in general conformation to any ordinary inner tube of a pneumatic tire. As will be hereinafter more fully described, the axle of the vehicle is received within a bearing sleeve or bushing 16, which is of an external diameter equal to the internal diameter of the pneumatic tube or cushion 15 when flat or uninflated. The sleeve is provided at each terminal as shown best in Fig. 3 with the longitudinally extending lugs or spurs 17, there being preferably 3 of these at each end of the sleeve, although a greater or less number may be employed if deemed expedient.

The inner end of the body portion 14 is partially closed by the integral wall 18. This member 18 is cut away at its central portion to produce the opening 19. This opening 19 is so formed that three separate slots or recesses 20 are formed around its edge. These notches or recesses 20 are designed to receive the lugs at the inner end of the sleeve, so that this member will be held against rotation with respect to the body casing 14, and the tube 15. As a means for holding the outer end of the axle receiving sleeve 16 against rotation, there is provided a plate 21, in which is formed an opening 22, having notches 23, which correspond to the notches 20. The lugs at the outer end of the sleeve 16 are received within the notches 23 when the wheel hub is assembled. The notches 20 and 23 are of such size and are separated from each other in such manner that the sleeve 16 is capable of slight radial motion within the body member 14. In this manner the pneumatic tube or cushion 15 acts as a yieldable supporting element or cushion for the sleeve 16, and consequently the axle therein, so that the major portion of the shocks to which the vehicle would ordinarily be subjected, is absorbed at the wheel center. The plate 21 is held in the proper position at the outer end of the member 14 by means of the screws or equivalent devices 24 which pass through the plate.

When the pneumatic hub shown in the drawings is to be employed with the rear axle 25 of an automobile, the axle can of course be keyed in the sleeve 21 by an ordinary feather or any other device so that the wheel may be fixed with respect to the axle.

If desired the integral end wall of the hub casing may be formed as a separate and removable element. Also if found desirable, the notches which receive the terminal lugs of the axle receiving sleeve may be formed as counter-sunk recesses in the inner faces of the end walls of the casing, the openings through the end wall being only large enough to receive the axle.

What I claim is:

In a resilient hub construction, the combination with an axle having a flange thereon, of a sleeve mounted on said axle, said sleeve having each end thereof formed with a plurality of recesses, a dish-shaped wheel base having, at its center, projections for entering the recesses at the end of said sleeve adjacent said flange, a face plate removably secured to said wheel base, said face plate having, at its center, projections for entering the recesses at the other end of said sleeve, a pneumatic cushion inclosed in said wheel base and engaging between the latter and said sleeve and means on said axle for engaging the outer part of said sleeve and said face plate, whereby said flange and said engaging means prevent movement of said wheel base longitudinally on the axle.

In testimony whereof, I the said JOHN W. MARTIN have hereunto set my hand.

JOHN W. MARTIN.

Witnesses:
J. N. COOKE,
C. L. LANDOW.

Copies of this patent may be obtained for five cents each, by addressing the "Commissioner of Patents, Washington, D. C."